United States Patent [19]

Ichikawa et al.

[11] Patent Number: 4,613,964
[45] Date of Patent: Sep. 23, 1986

[54] OPTICAL INFORMATION PROCESSING METHOD AND APPARATUS THEREFOR

[75] Inventors: Izumi Ichikawa; Hideaki Sato, both of Yokohama, Japan

[73] Assignee: Canon Kabushiki Kaisha, Tokyo, Japan

[21] Appl. No.: 521,347

[22] Filed: Aug. 8, 1983

[30] Foreign Application Priority Data

Aug. 12, 1982 [JP] Japan ................................. 57-140232

[51] Int. Cl.4 .............................................. G11B 7/09
[52] U.S. Cl. ...................... 369/45; 369/124; 369/100; 369/175; 360/65; 250/201
[58] Field of Search ............ 369/124, 45, 100, 106, 369/54, 175, 116; 360/65; 250/201 DF

[56] References Cited

U.S. PATENT DOCUMENTS 4,165,495 8/1979 Takahashi ............................ 360/65
4,340,950 7/1982 Kosaka ................................. 360/65
4,370,679 1/1983 Ceshkovsky ......................... 360/65

*Primary Examiner*—Alan Faber
*Attorney, Agent, or Firm*—Fitzpatrick, Cella, Harper & Scinto

[57] ABSTRACT

An optical information processing method and an apparatus therefor for information recording on or information readout from a recording medium by converging a light beam onto the recording medium, in which the wave form equalization characteristic of the signal upon information recording or information readout is controlled in accordance with the information on the state of focus of the light beam on the recording medium.

9 Claims, 9 Drawing Figures

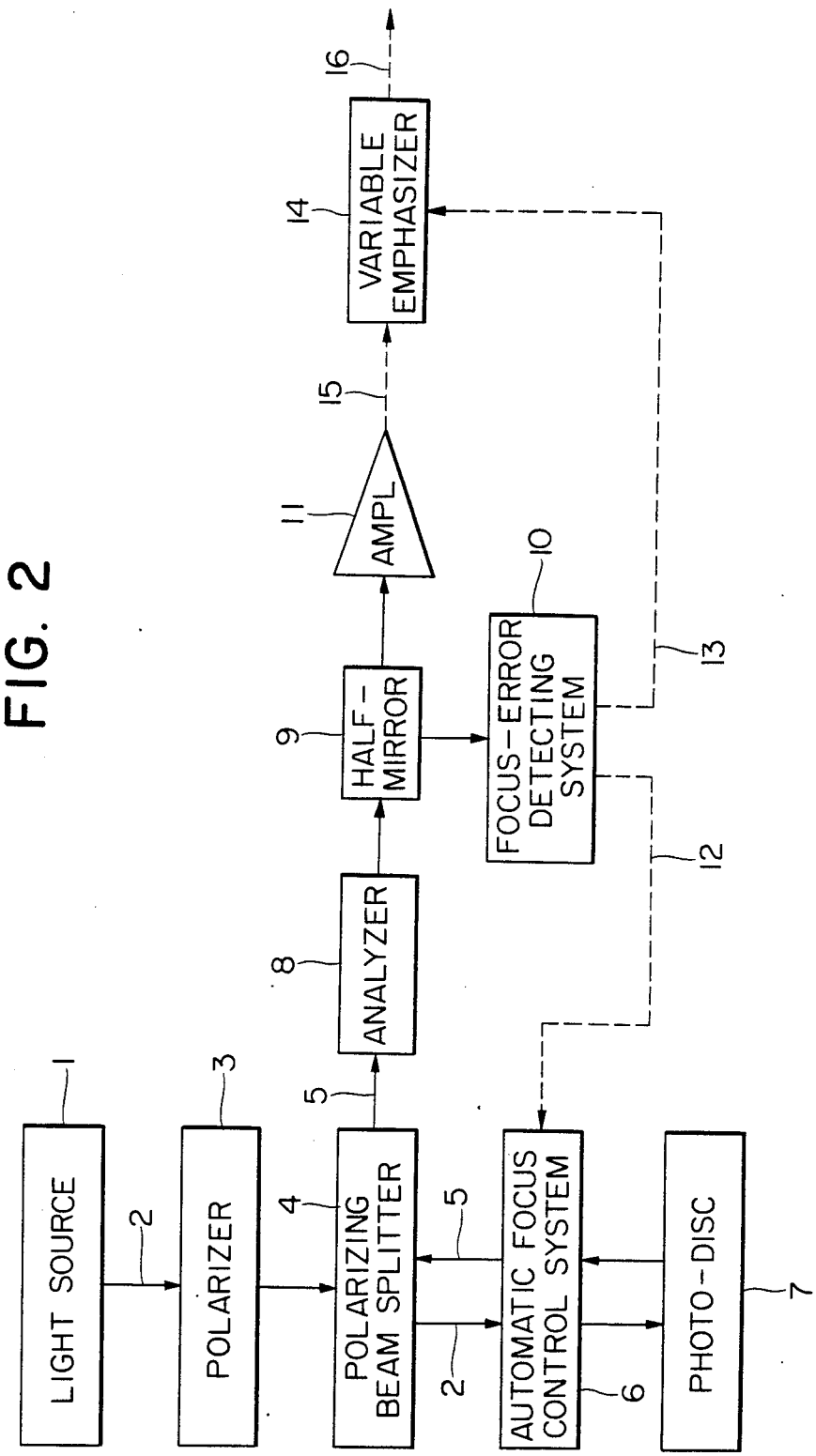

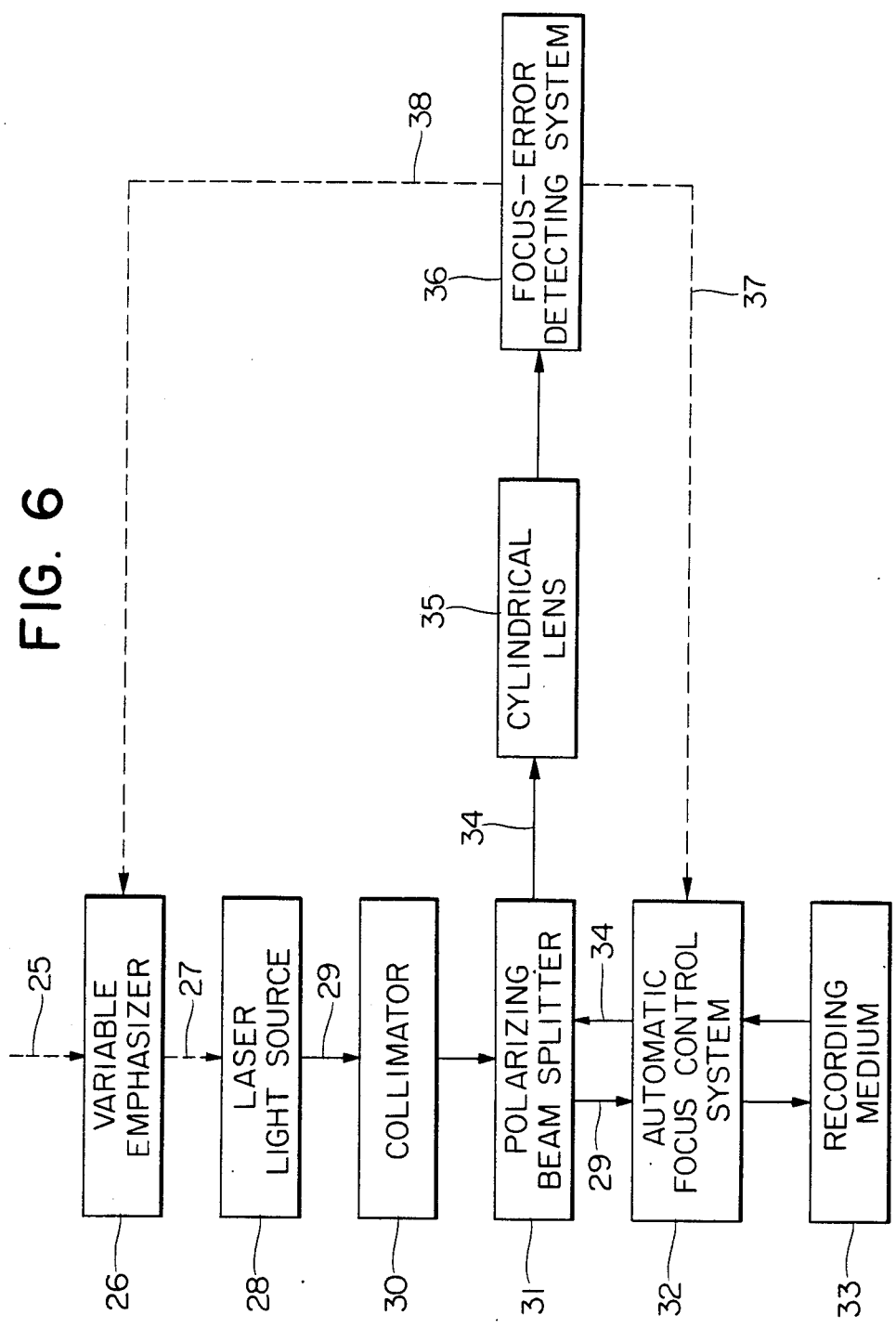

OPTICAL INFORMATION PROCESSING METHOD AND APPARATUS THEREFOR

BACKGROUND OF THE INVENTION

1. Field of the Invention

The present invention relates to an optical information processing method and an apparatus therefor, and more particularly to such method and apparatus for controlling the wave form equalization characteristic, in information recording on or information readout from a recording medium by converging a light beam onto said recording medium.

2. Description of the Prior Art

In the present invention, the term "wave form equalization characteristic" means a characteristic for maintaining the signals obtained from an optical information processing apparatus exactly equivalent to the signals entered into said apparatus such that, in the aspect of waveform, any change such as an attenuation of amplitude at higher frequencies is prevented.

In the optical information processing apparatus such as a photo-disk memory, the automatic focusing optical system has conventionally been controlled by the control information obtained from the light beam reflected by the recording medium or disk. Such control system, generally including electromechanical components such as a magnetic actuator, inevitably results in a lack or a delay of response at high frequency components of the focus-error signals. In this manner the focusing control has a certain limit, so that the light beam may eventually become out of focus. As the result, relative to the signal recorded on the disk and having a waveform such as shown in FIG. 1A, the regenerated output wave form shows an amplitude loss in the high frequency region as shown in FIG. 1B. Also upon signal recording, the signal recording efficiency at high frequency region becomes lower due to the out-of-focus phenomenon explained above. Similar phenomena are also observable in digital signals. In this manner the conventional optical information processing method and apparatus have been associated with a deterioration in the wave form equalization characteristic due to the out-of-focus phenomenon, both in the signal recording and in the signal readout.

SUMMARY OF THE INVENTION

An object of the present invention is to provide an optical information processing method and an apparatus therefor, capable of showing an excellent wave form equalization characteristic over a wide frequency range, both in the information recording and in the information readout.

The foregoing object can be achieved, according to the present invention, by an optical information processing method and an aparatus therefor for information recording on or information readout from a recording medium by converging a light beam on said recording medium, wherein the signal waveform equalization characteristic upon information recording or information readout is controlled on the basis of the information on the state of focus of said light beam on said recording medium.

Other objects and features of the present invention will be apparent from the following description with reference to the attached drawings.

BRIEF DESCRIPTION OF THE DRAWINGS

FIG. 2 is a block diagram of an embodiment of the optical information readout apparatus of the present invention;

FIG. 6 is a block diagram showing an embodiment of the optical information recording apparatus of the present invention.

DETAILED DESCRIPTION OF THE PREFERRED EMBODIMENTS

Figure 1A:
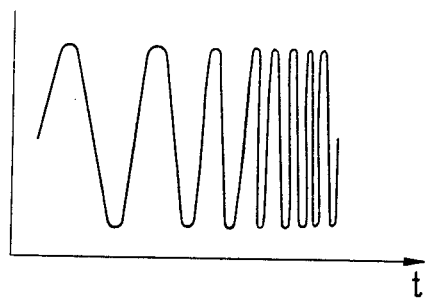
FIGS. 1A and 1B are wave form charts showing the deterioration in the wave form equalization characteristic in a conventional optical information processing apparatus.
Figure 1B:
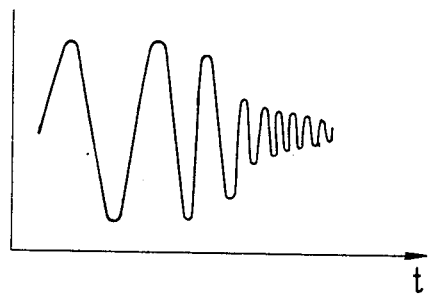

Now reference is made to FIG. 2 showing an embodiment of the optical information readout apparatus of the present invention, wherein shown are a light source 1; a readout lightbeam 2; an optical system 3 composed for example of a polarizer for improving transmission efficiency; a polarizing beam splitter 4 for separating the readout beam from a beam 5 reflected back from the disk; an automatic focus control system 6 for converging the readout beam onto the photo-disk and controlling the focus state on the basis of the control information; a photo-disk 7; an optical system 8 composed for example of an analyzer for signal detection; a half-mirror 9 for splitting the reflected beam 5 to direct the same to a focus-error detecting system and a signal readout system; a focus-error detecting system 10 for detecting the out-of-focus state by means of a photo-sensor; a signal readout amplifier 11; an automatic focus control signal 12; a focus-error signal 13; a variable emphasizer circuit of which transmission function is variable in accordance with the focus-error signal 13; a readout signal 15 from the amplifier 11; and an output signal 16.

The operation of the above-described embodiment will now be described in the following. The readout beam 2 emitted from the light source 1 passes through the optical system 3, polarizing beam splitter 4 and automatic focus control system 6 and reaches the photo-disk 7, where said beam is reflected by said photo-disk 7 to generate a reflected beam 5 containing the information recorded on said photo-disk 7. Through the automatic focus control system 6, said reflected beam 5 again reaches the polarizing beam splitter 4, where it is separated from the readout beam 2. Then said reflected beam 5 passes through the optical system 8 and is divided, by the half mirror 9, into those beams directed to the focus error detecting system 10 and to the information readout system 11. The photo-sensor of the focus error detecting system 10 is adapted to discriminate the state of focus of the readout beam 2 on the photo-disk on the basis of the reflected beam which has entered into the detecting system 10, and, in case of the out-of-focus state, the automatic focus control system 6 is controlled in accordance with the automatic focus control signal 12. On the other hand, the reflected beam entering the signal readout system is converted by the amplifier 11 into the readout signal 15 which in turn is supplied to the variable emphasizer circuit 14. Said variable emphasizer circuit 14 is controlled in accordance with the focus-error signal 13 supplied from the focus-error detecting system, and performs relative amplification of the high frequency components of the readout signal 15 supplied from the amplifier 11, in accordance with the state of focus of the readout beam on the disk, thus providing the output signal 16. Thus, the circuit 14 is adapted to compensate the attenuation in the high frequency region of the readout output resulting from the out-of-focus state, and thus controls the wave form equalization characteristic.

Figure 3A:
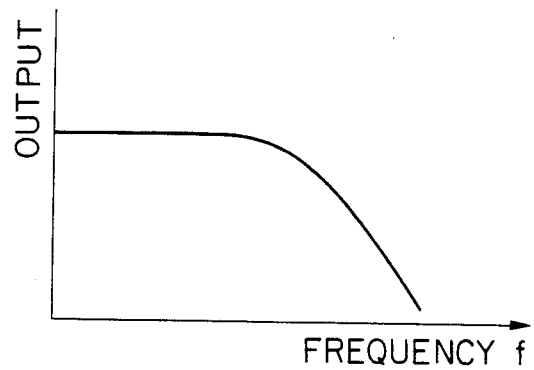
FIGS. 3A, 3B and 3C are frequency characteristic charts showing the control procedure for the wave form equalization characteristic in the embodiment shown in FIG. 2.
Figure 3B:
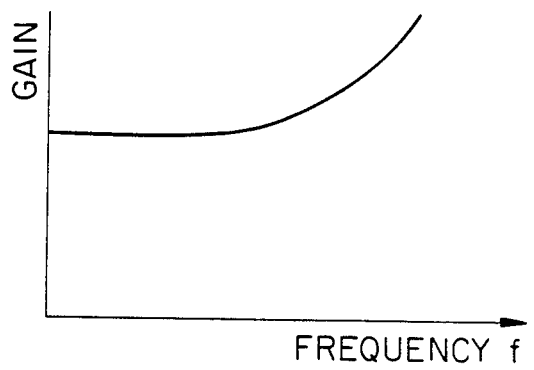
Figure 3C:
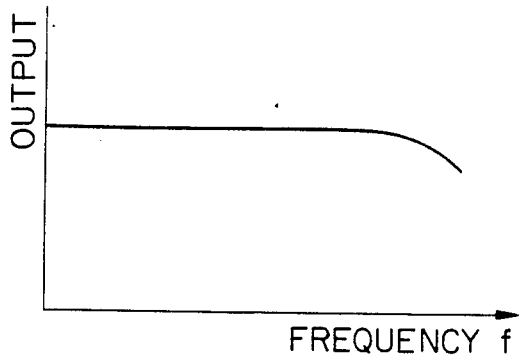

The above-described control procedure for the wave form equalization characteristic will be further clarified with reference to FIGS. 3A, 3B and 3C. In case the readout beam 2 shown in FIG. 2 becomes out of focus on the photo-disk 7, the readout signal 15 shows an attenuation in the high frequency region as shown in FIG. 3A. In the present embodiment, such out-of-focus state is detected and the frequency characteristic of the variable emphasizer circuit 14 is changed, as shown in FIG. 3B, in accordance with the focus-error signal 13 to achieve relative amplification of the high frequency components of the readout signal. In this manner, the output loss in the high frequency region resulting from the out-of-focus state is compensated, whereby the output signal as shown in FIG. 3C is obtained.

In the present embodiment the information readout is achieved by receiving the light reflected from the recording medium, but the information readout may also be carried out by detecting the light transmitted through the recording medium. Also the recording medium is not limited to the photo-disk.

Figure 4:
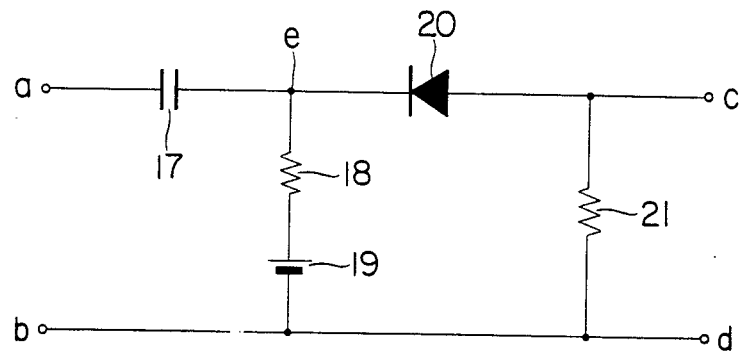
FIGS. 4 and 5 are diagrams of examples of a variable emphasizer circuit employable in the present invention.

FIG. 4 shows an example of the variable emphasizer circuit employable in the foregoing embodiment. In FIG. 4, there are shown a capacitor 17 for cutting off the D.C. component; a load resistor 18, a D.C. power supply 19; a variable capacitor 20; and a resistor 21. This circuit basically comprises a differentiating circuit composed of the variable compacitor 20 and the resistor 21. The readout signal is supplied across terminals a, b and the output signal is obtained across terminals c, d. The capacity of the variable capacitor 20 is controlled in accordance with the focus-error signal supplied to a terminal e to suppress the loss of the output signal in the high frequency components, thus controlling the wave form equalization characteristic. The variable capacitor 20 may take the form of a variable capacitance diode, a varicap or a varactor. As is known, if a reverse direction voltage is applied to a diode, the diode develops an electrostatic capacity and thus functions as a capacitor.

Figure 5:
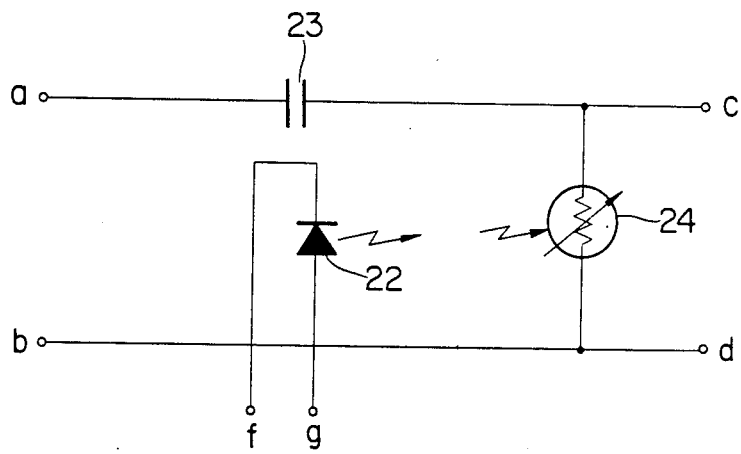

FIG. 5 shows another example of the variable emphasizer circuit which comprises a light-emitting diode 22, a capacitor 23 and a CdS resistor 24, wherein the output of said light-emitting diode 22 is varied in accordance with the focus-error signal supplied across terminals f, g to control the CdS resistor 24 to thereby control the wave form equalization characteristic, in a manner similar as explained with reference to FIG. 4.

The variable emphasizer circuit may further assume various circuit structures. Particularly a circuit capable of controlling both the capacity and the resistance in accordance with the focus-error signal is preferable because of its wide adaptability.

FIG. 6 is a block diagram showing an embodiment of the optical information recording apparatus of the present invention, wherein shown are an input signal 25; a variable emphasizer circuit 26; a recording signal 27; a semi-conductor laser device 28; a recording beam 29; an optical system 30 such as a collimator; a polarizing beam splitter 31; an automatic focus control system 32 including means for converging the recording beam onto a recording medium; a recording medium 33 such as a photo-disk; a beam 34 reflected by the recording medium; an optical system 35 composed for example of a cylindrical lens for detecting the focus error; a focus error detecting system 36; an automatic focus control signal 37; and a focus-error signal 38.

The operation of the above-described embodiment will now be described. The input signal 25 is converted by the variable emphasizer circuit into the recording signal 27 to drive the semi-conductor laser device 28, thus emitting the recording beam 29. Said recording beam 29 is directed through the optical system 30, polarizing beam splitter 31 and automatic focus control system 32 to the recording medium 33, thus recording information thereon. Said recording beam 29 is also reflected by the recording medium 33, and the resulting reflected beam 34 is guided through the automatic focus control system 32, then reflected by the polarizing beam splitter 31 and further guided through the optical system 35 to the focus-error detecting system 36. Said system 36 is adapted, by means of a photo-sensor, to discriminate the state of focus of the recording beam 29 on the recording medium, and, in case of the out-of-focus state, the automatic focus control system 32 is controlled in accordance with the automatic focus control signal 37, thus achieving automatic focusing function. Also the focus-error signal 38 is supplied, as a feedback signal, to the variable emphasizer circuit 26. Said emphasizer circuit 26 is controlled in accordance with said focus-error signal 38, and, in case the recording beam is out of focus, it provides, in advance, relative amplification of the high frequency components of the input signal 25, thus controlling the wave form equalization characteristic. In this manner, the light beam intensity is enhanced in the high frequency region where the recording efficiency has been deteriorated due to the out-of-focus state of the recording beam, thus enabling signal recording with a constant efficiency over a wide frequency range.

In the present embodiment, the variable emphasizer circuit can be the same as that employed in the foregoing embodiment, for example as shown in FIGS. 4 and 5. Other circuit structures may, of course, be likewise employed. Also the present invention is not limited to the use of the above-described variable emphasizer circuit, but may employ any other means capable of performing relative amplification of the high frequency region of the signal in accordance with the focus-error signal.

In accordance with the present invention, as explained in the foregoing, the wave form equalization characteristic is controlled on the basis of the focuserror information of the recording or readout beam, so that a constant recording efficiency or constant readout signal is obtainable regardless of the frequency region, thus improving the quality of information.

What we claim is:

1. An optical information processing method for information recording on or information readout from a recording medium by converging a light beam onto said recording medium, said method comprising controlling the signal wave form equalization characteristic upon said information recording or at said information readout, in accordance with the information on the state of focus of said light beam on said recording medium.

2. An optical information processing apparatus comprising:
    converging means for converging a light beam into a recording medium;
    readout means for detecting said light beam reflected from or transmitted through said recording medium and putting out a readout signal bearing the information recorded on said recording medium;
    detecting means for detecting the state of focus of said light beam on said recording medium; and
    control means for performing relative amplification of the high frequency components of said readout signal in accordance with the focus-error signal supplied from said detecting means and for controlling the wave form equalization characteristic.

3. An optical information processing apparatus according to claim 2, wherein said control means comprises a variable emphasizer circuit for receiving the output signal from said readout means.

4. An optical information processing apparatus according to claim 3, wherein said variable emphasizer circuit comprises a differentiating circuit in which the capacity of a capacitor and/or the resistance of a resistor is varied in accordance with said focus-error signal.

5. An optical information processing apparatus according to claim 2, wherein said converging means is controlled so as to converge said light beam onto said recording medium in accordance with the focus-error signal from said detecting means.

6. An optical information processing apparatus comprising:
    modulating means for modulating a light beam in accordance with a recording signal;
    converging means for converging said modulated light beam onto a recording medium;
    detecting means for detecting the state of focus of said light beam on said recording medium; and
    control means for performing relative amplification of the high frequency components of said recording signal in accordance with the focus-error signal from said detecting means and for controlling the wave form equalization characteristic.

7. An optical information processing apparatus according to claim 6, wherein said control means comprises a variable emphasizer circuit for receiving said recording signal and supplying an output signal to said modulating means.

8. An optical information processing apparatus according to claim 7, wherein said variable emphasizer circuit comprises a differentiating circuit in which the capacity of a capacitor and/or the resistance of a resistor is varied in accordance with said focus-error signal.

9. An optical information processing apparatus according to claim 6, wherein said converging means is controlled so as to converge said light beam onto said recording medium in accordance with the focus-error signal from said detecting means.

* * * * *

UNITED STATES PATENT AND TRADEMARK OFFICE
CERTIFICATE OF CORRECTION

PATENT NO. : 4,613,964
DATED : September 23, 1986
INVENTOR(S) : IZUMI ICHIKAWA, ET AL.

It is certified that error appears in the above-identified patent and that said Letters Patent is hereby corrected as shown below:

Column 1, line 58, change "aparatus" to --apparatus--.

Column 2, line 26, change "lightbeam" to --light beam --; and line 62, after "in" insert --the--.

Column 3, line 36, change "," to --;--;

line 39, change "compacitor" to --capacitor--;

line 58, change "as" to --to that--; and line 60, after "Particularly" insert --,--.

UNITED STATES PATENT AND TRADEMARK OFFICE
CERTIFICATE OF CORRECTION

PATENT NO. : 4,613,964            Page 2 of 2

DATED : September 23, 1986

INVENTOR(S) : IZUMI ICHIKAWA, ET AL.

It is certified that error appears in the above-identified patent and that said Letters Patent is hereby corrected as shown below:

Column 4, line 26, after "in" insert --the--; and line 55, change "focuserror" to --focus-error--.

Column 5, line 3, change "into" to --onto--.

Signed and Sealed this

Thirteenth Day of January, 1987

*Attest:*

DONALD J. QUIGG

*Attesting Officer*      *Commissioner of Patents and Trademarks*